(12) United States Patent
Endo

(10) Patent No.: US 11,034,344 B2
(45) Date of Patent: Jun. 15, 2021

(54) VEHICLE HAVING A FILTER DISPOSED IN AN EXHAUST PASSAGE

(71) Applicant: TOYOTA JIDOSHA KABUSHIKI KAISHA, Toyota (JP)

(72) Inventor: Hiroki Endo, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/353,466

(22) Filed: Mar. 14, 2019

(65) Prior Publication Data

US 2019/0315334 A1  Oct. 17, 2019

(30) Foreign Application Priority Data

Apr. 11, 2018  (JP) .............................. JP2018-076348

(51) Int. Cl.
  *B60W 20/13*  (2016.01)
  *B60W 10/06*  (2006.01)
  *B60W 20/20*  (2016.01)

(52) U.S. Cl.
  CPC ............ *B60W 20/13* (2016.01); *B60W 10/06* (2013.01); *B60W 20/20* (2013.01); *B60W 2510/244* (2013.01); *B60W 2530/12* (2013.01); *B60Y 2200/92* (2013.01)

(58) Field of Classification Search
  CPC ...... B60W 20/13; B60W 10/06; B60W 20/20; B60W 2530/12

USPC .................................................... 701/22, 36
See application file for complete search history.

(56) References Cited

U.S. PATENT DOCUMENTS

| 2013/0197735 | A1  | 8/2013  | Ueno   |          |
|--------------|-----|---------|--------|----------|
| 2016/0053648 | A1* | 2/2016  | Iojoiu | F02D 41/029 60/274 |
| 2017/0314446 | A1* | 11/2017 | Naidu  | F01N 3/023 |

FOREIGN PATENT DOCUMENTS

| JP | 2005-337176 A    | 12/2005  |
| JP | 2005337176 A  *  | 12/2005  |
| NO | 2012/098744 A1   | 7/2012   |

\* cited by examiner

*Primary Examiner* — Isaac G Smith
(74) *Attorney, Agent, or Firm* — Oliff PLC

(57) ABSTRACT

A vehicle 1 comprises an internal combustion engine 10, a filter 61, a motor 16, a battery 20, a trapped amount calculating part 91 configured to calculate an amount of particulate matter, a state-of-charge estimating part 92 configured to estimate a state of charge of the battery, an engine load setting part 93 configured to set an engine load, and an internal combustion engine control part 94. The engine load setting part is configured to make the engine load increase in the case where the amount of the particulate matter is relatively large compared to the case where the amount of the particulate matter is relatively small when it is estimated that the battery can be charged. The engine load setting part is configured to change an amount of increase of the engine load in accordance with the amount of the particulate matter when making the engine load increase.

17 Claims, 9 Drawing Sheets

VEHICLE HAVING A FILTER DISPOSED IN AN EXHAUST PASSAGE

FIELD

The present invention relates to a vehicle.

BACKGROUND

In the past, it has been known to provide a filter at an exhaust passage of an internal combustion engine so as to trap particulate matter (PM) contained in exhaust gas. Using the filter, it is possible to keep the PM from being discharged into the atmosphere and possible to improve the exhaust emission.

However, if the amount of PM trapped at the filter becomes greater, the filter will become clogged. As a result, the back pressure will rise and the fuel efficiency will deteriorate. For this reason, it is desirable to regenerate the filter by burning off the PM before the filter becomes clogged.

In a hybrid vehicle described in PTL 1, filter regeneration control is performed when a predetermined filter regeneration condition is satisfied. In filter regeneration control, the engine load is made to increase to supply high temperature exhaust gas to the filter and thereby burn off the PM. Further, when the filter is clogged but the filter regeneration condition is not satisfied, the internal combustion engine and motor generator are controlled so as to suppress buildup of PM on the filter.

CITATION LIST

Patent Literature

[PTL 1] Japanese Unexamined Patent Publication No. 2005-337176

SUMMARY

Technical Problem

However, even if control has been performed for suppressing buildup of PM, the amount of buildup of PM will increase a bit at a time until the PM is burned off. For this reason, sometimes the filter regeneration condition will be satisfied and filter regeneration control will be performed after the amount of buildup of PM becomes extremely great. In this case, the amount of heat generated by burning the PM is liable to become greater and the filter is liable to be degraded. Further, until filter regeneration control is performed, a state of a high back pressure will be maintained, so the fuel efficiency will greatly deteriorate.

Therefore, in view of the above technical problem, an object of the present invention is to provide a vehicle in which the PM trapped on a filter arranged in an exhaust passage of an internal combustion engine can be effectively removed.

Solution to Problem

The summary of the present disclosure is as follows.

(1) A vehicle comprising an internal combustion engine able to output power for driving use, a filter disposed in an exhaust passage of the internal combustion engine and trapping particulate matter contained in exhaust gas, a motor able to output power for driving use, a battery storing power generated using the output of the internal combustion engine and supplying power to the motor, a trapped amount calculating part configured to calculate an amount of particulate matter trapped by the filter, a state-of-charge estimating part configured to estimate a state of charge of the battery, an engine load setting part configured to set an engine load, and an internal combustion engine control part configured to control the internal combustion engine based on the engine load set by the engine load setting part, wherein the engine load setting part is configured to make the engine load increase in the case where the amount of the particulate matter is relatively large compared to the case where the amount of the particulate matter is relatively small when it is estimated that the battery can be charged and the engine load setting part is configured to change an amount of increase of the engine load in accordance with the amount of the particulate matter when making the engine load increase.

(2) The vehicle described in above (1), wherein the engine load setting part is configured to make the engine load increase in stages as the amount of the particulate matter becomes greater.

(3) The vehicle described in above (1), wherein the engine load setting part is configured to make the engine load increase continuously as the amount of the particulate matter becomes greater.

(4) The vehicle described in above (3), wherein the engine load setting part is configured to lower a rate of increase of the engine load with respect to the amount of the particulate matter as the amount of the particulate matter becomes greater.

(5) The vehicle described in any one of above (1) to (4), wherein the engine load setting part is configured to set the engine load to a predetermined value or less when it is estimated that the battery can be discharged and the amount of the particulate matter is equal to or more than a reference value.

(6) The vehicle described in above (5), wherein the reference value is an amount of the particulate matter when the filter is completely clogged.

(7) The vehicle described in above (5) or (6), wherein the engine load setting part is configured to set the engine load to zero when it is estimated that the battery can be discharged and the amount of the particulate matter is equal to or more than the reference value.

(8) The vehicle described in any one of above (1) to (7), wherein the engine load setting part is configured to set the engine load to an upper limit value or less when making the engine load increase, the upper limit value being smaller than a maximum engine load.

(9) The vehicle described in above (8), wherein the engine load setting part is configured to raise the upper limit value the greater an amount of power which can be charged to the battery.

Advantageous Effects of Invention

According to the present invention, there is provided a vehicle in which the PM trapped on a filter arranged in an exhaust passage of an internal combustion engine can be effectively removed.

DESCRIPTION OF EMBODIMENTS

Figure 1:
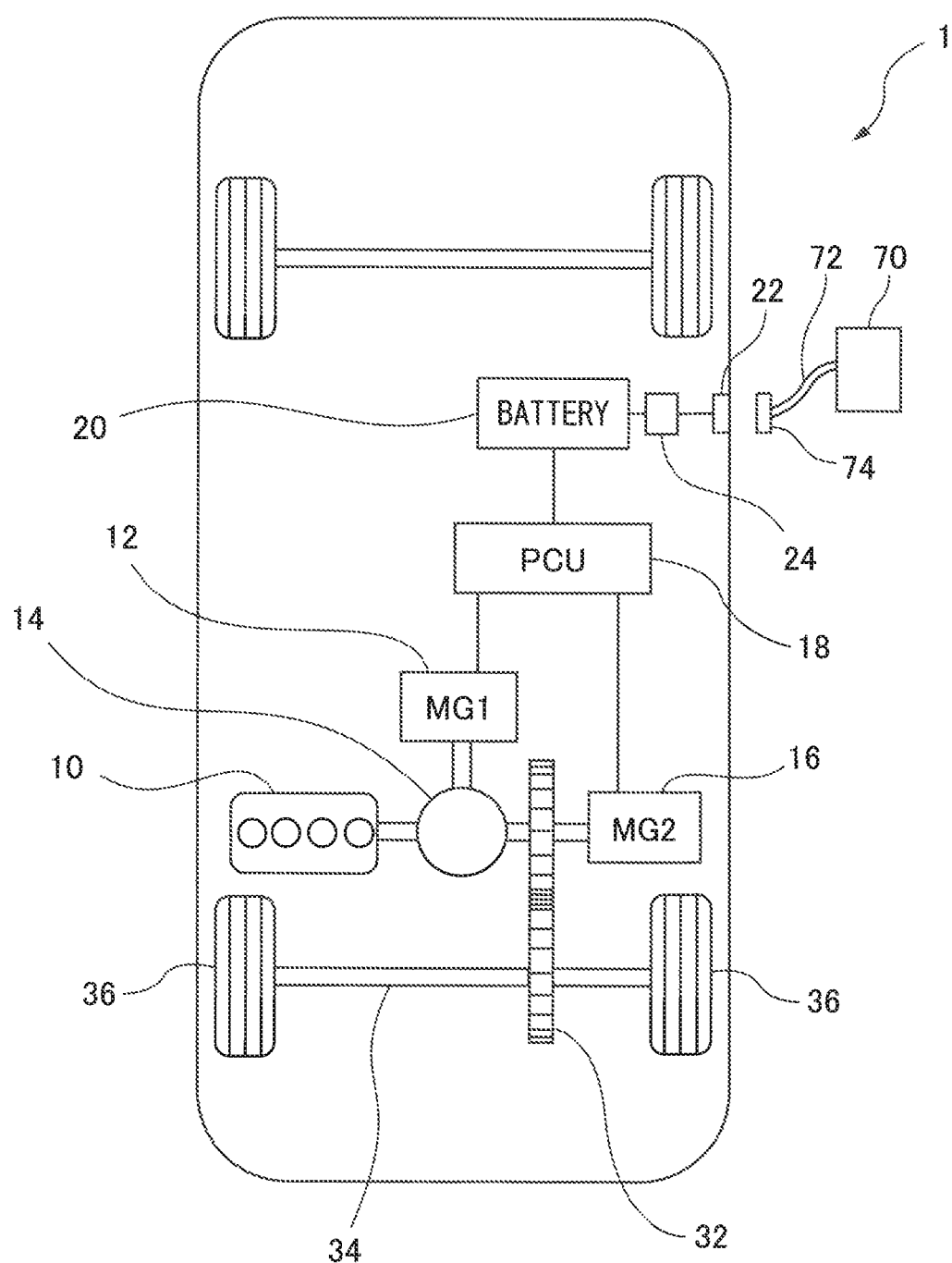
FIG. 1 is a view schematically showing the configuration of a vehicle according to a first embodiment of the present invention.

Below, referring to the drawings, embodiments of the present invention will be explained in detail. Note that, in the following explanation, similar components are assigned the same reference signs.

First Embodiment

Below, referring to FIG. 1 to FIG. 4, a first embodiment of the present invention will be explained.
<Configuration of Vehicle>
FIG. 1 is a view schematically showing the configuration of a vehicle 1 according to the first embodiment of the present invention. A vehicle 1 is provided with an internal combustion engine 10, first motor-generator 12, power distributing mechanism 14, second motor-generator 16, power control unit (PCU) 18, and battery 20.

The internal combustion engine 10 burns an air-fuel mixture of fuel and air in cylinders to output power. An output shaft of the internal combustion engine 10 (crankshaft) is mechanically connected to the power distributing mechanism 14, and output of the internal combustion engine 10 is input to the power distributing mechanism 14.

The first motor-generator 12 functions as a generator and motor. The first motor-generator 12 is mechanically connected to the power distributing mechanism 14, and the output of the first motor-generator 12 is input to the power distributing mechanism 14. Further, the first motor-generator 12 is electrically connected to the PCU 18. When the first motor-generator 12 functions as a generator, the electric power generated by the first motor-generator 12 is supplied through the PCU 18 to at least one of the second motor-generator 16 and battery 20. On the other hand, when the first motor-generator 12 functions as a motor, the electric power stored in the battery 20 is supplied through the PCU 18 to the first motor-generator 12.

The power distributing mechanism 14 is configured as a known planetary gear mechanism including a sun gear, ring gear, pinion gears, and a planetary carrier. The output shaft of the internal combustion engine 10 is coupled with the planetary carrier, the first motor-generator 12 is coupled with the sun gear, and a speed reducer 32 is coupled with the ring gear. The power distributing mechanism 14 distributes the output of the internal combustion engine 10 to the first motor-generator 12 and the speed reducer 32.

Specifically, when the first motor-generator 12 functions as a generator, the output of the internal combustion engine 10 input to the planetary carrier is distributed to the sun gear coupled with the first motor-generator 12 and the ring gear coupled with the speed reducer 32 in accordance with the gear ratio. The output of the internal combustion engine 10 distributed to the first motor-generator 12 is used to generate electric power by the first motor-generator 12. On the other hand, the output of the internal combustion engine 10 distributed to the speed reducer 32 is transmitted as power for driving use through an axle 34 to the wheels 36. Therefore, the internal combustion engine 10 can output power for driving use. Further, when the first motor-generator 12 functions as a motor, the output of the first motor-generator 12 is supplied through the sun gear and planetary carrier to the output shaft of the internal combustion engine 10 whereby the internal combustion engine 10 is cranked.

The second motor-generator 16 functions as a generator and motor. The second motor-generator 16 is mechanically connected to the speed reducer 32, and the output of the second motor-generator 16 is supplied to the speed reducer 32. The output of the second motor-generator 16 supplied to the speed reducer 32 is transmitted as power for driving use to the wheels 36 through the axle 34. Therefore, the second motor-generator 16 can output power for driving use.

Further, the second motor-generator 16 is electrically connected to the PCU 18. At the time of deceleration of the vehicle 1, due to rotation of the wheels 36, the second motor-generator 16 is driven and the second motor-generator 16 functions as a generator. As a result, so-called regeneration is performed. When the second motor-generator 16 functions as a generator, the regenerative power generated by the second motor-generator 16 is supplied through the PCU 18 to the battery 20. On the other hand, when the second motor-generator 16 functions as a motor, the power stored in the battery 20 is supplied through the PCU 18 to the second motor-generator 16.

The PCU 18 is electrically connected to the first motor-generator 12, second motor-generator 16, and battery 20. The PCU 18 includes an inverter, a booster converter, and a DC-DC converter. The inverter converts DC power supplied from the battery 20 to AC power and converts AC power generated by the first motor-generator 12 or second motor-generator 16 to DC power. The booster converter boosts the voltage of the battery 20 in accordance with need when the power stored in the battery 20 is supplied to the first motor-generator 12 or the second motor-generator 16. The DC-DC converter lowers the voltage of the battery 20 when the electric power stored in the battery 20 is supplied to the headlights of the vehicle 1 or other electronic equipment.

The battery 20, for example, is a lithium ion battery, nickel hydrogen battery, or other secondary battery. The battery 20 stores the power generated by the first motor generator 12 using the output of the internal combustion engine 10 and the regenerative power generated by the second motor generator 16 using regenerated energy. Therefore the battery 20 can be charged by the output of the internal combustion engine 10 and the regenerated energy. The battery 20 supplies power to the first motor generator 12 when the first motor generator 12 functions as a motor and supplies power to the second motor generator 16 when the second motor generator 16 functions as a motor.

The vehicle 1 is further provided with a charging port 22 and charger 24. The battery 20 can be charged by an external power source 70 as well. Therefore, the vehicle 1 is a so-called "plug-in hybrid vehicle".

The charging port 22 is configured so as to receive the electric power from the external power source 70 through a charging connector 74 of a charging cable 72. When the battery 20 is charged by the external power source 70, the charging connector 74 is connected to the charging port 22. The charger 24 converts the electric power supplied from the external power source 70 to electric power which can be supplied to the battery 20. Note that, the charging port 22 may also be connected to the PCU 18, and the PCU 18 may also function as the charger 24.

<Configuration of Internal Combustion Engine>

Figure 2:
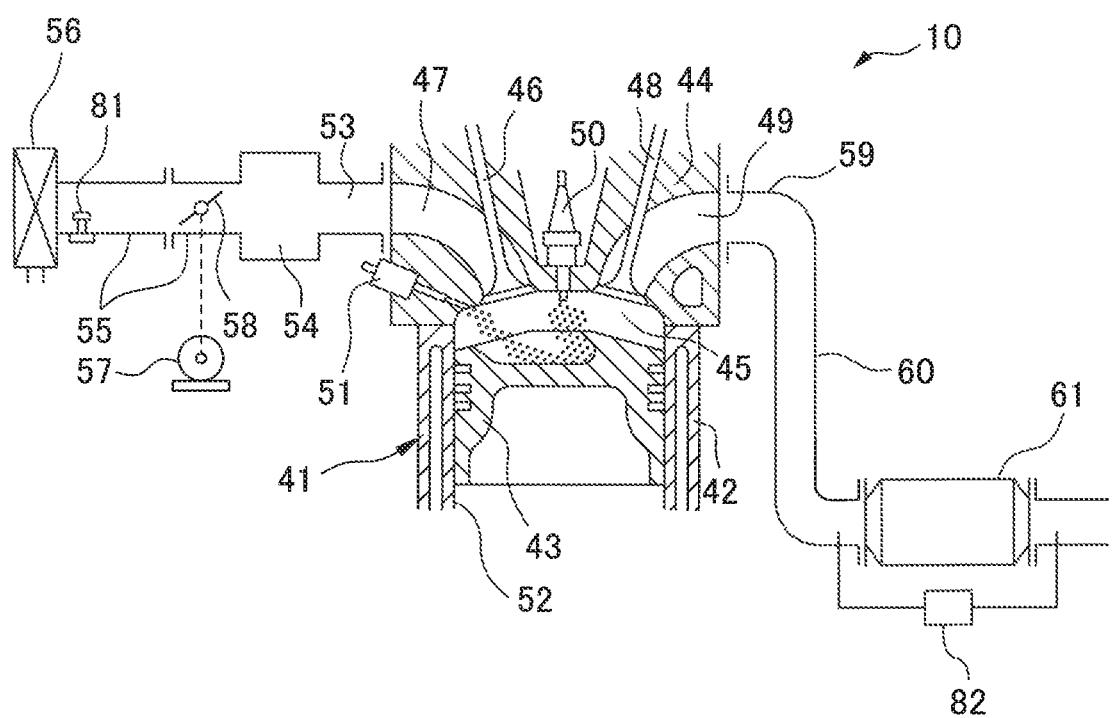
FIG. 2 is a view schematically showing an internal combustion engine mounted in the vehicle according to the first embodiment of the present invention.

FIG. 2 is a view schematically showing the internal combustion engine 10 mounted in the vehicle 1 according to the first embodiment of the present invention. The internal combustion engine 10 is a spark ignition type internal combustion engine, specifically, it is a gasoline engine using gasoline as fuel.

The internal combustion engine 10 includes an engine body 41 including a cylinder block 42 and a cylinder head 44. Inside of the cylinder block 42, a plurality of cylinders 52 are formed. In the cylinders 52, pistons 43 reciprocating in the axial directions of the cylinders 52 are arranged. Between the pistons 43 and the cylinder head 44, combustion chambers 45 are formed. The internal combustion engine 10 is provided with electronic control type fuel injectors 51 injecting fuel into the combustion chambers 45. The fuel injectors 51 are fastened to the cylinder head 44.

Intake ports 47 and exhaust ports 49 are formed in the cylinder head 44. The intake ports 47 and the exhaust ports 49 are connected to the combustion chambers 45. The intake ports 47 are opened and closed by intake valves 46, while the exhaust ports 49 are opened and closed by exhaust valves 48.

The intake ports 47 of the cylinders 52 are connected with a surge tank 54 through corresponding intake runners 53. The surge tank 54 is connected with an air cleaner 56 through an intake pipe 55. The intake ports 47, surge tank 54, intake pipe 55, etc., form an intake passage leading the air to the combustion chambers 45. Further, inside the intake pipe 55, a throttle valve 58 driven by a throttle valve drive actuator 57 is arranged. The throttle valve 58 changes the open area of the intake passage.

The exhaust ports 49 of the cylinders 52 are connected to an exhaust pipe 60 through an exhaust manifold 59. The exhaust pipe 60 is connected to a filter 61. The exhaust ports 49, exhaust manifold 59, exhaust pipe 60, etc., form an exhaust passage discharging the exhaust gas produced by combustion of the air-fuel mixture from the combustion chambers 45.

The filter 61 is arranged in the exhaust passage and traps particulate matter (PM) contained in the exhaust gas. The filter 61, for example, is a gasoline particulate filter (GPF). Note that, in addition to the filter 61, a catalyst for removing harmful substances in the exhaust gas (three-way catalyst etc.) may be arranged in the exhaust passage. Further, the surface of the filter 61 may be coated with a catalyst so that the filter 61 also has a catalytic function.

Note that, the configuration of the internal combustion engine 10 is not limited to the above configuration. Therefore, the specific configuration of the internal combustion engine such as the cylinder array, form of injection of fuel, configurations of the intake and exhaust systems, configuration of the valve operating mechanisms, and presence of a supercharger may differ from the configuration shown in FIG. 1. For example, the fuel injectors 51 may be arranged so as to inject fuel inside the intake ports 47. Further, the internal combustion engine 10 may be a diesel engine using diesel fuel as fuel. In this case, in the exhaust passage of the internal combustion engine 10, a diesel particulate filter (DPF) is arranged as the filter 61.

<Control Device of Vehicle>

Figure 3:
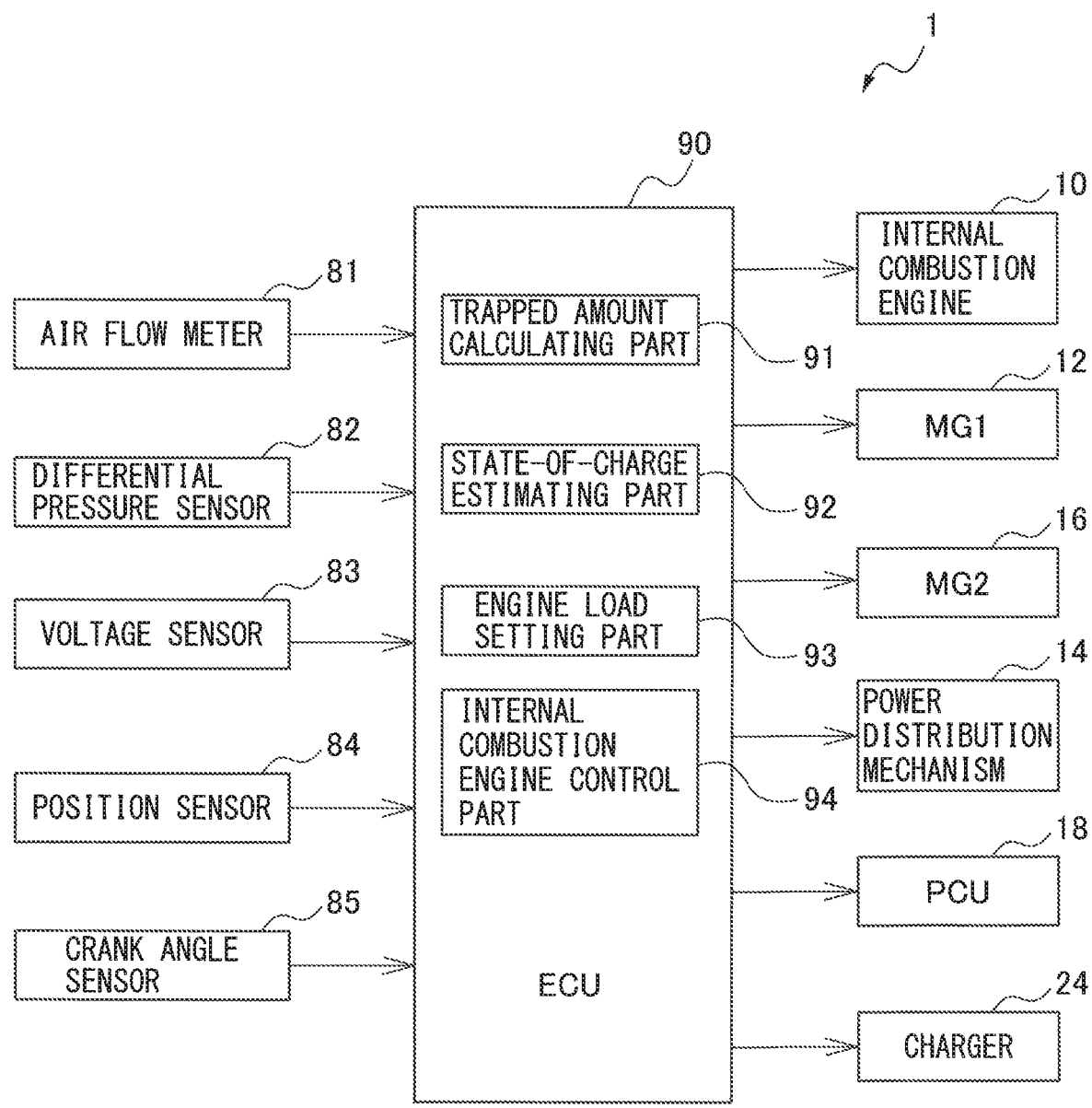
FIG. 3 is a block diagram schematically showing the configuration of the vehicle according to the first embodiment of the present invention.

FIG. 3 is a block diagram schematically showing the configuration of the vehicle 1 according to the first embodiment of the present invention. The vehicle 1 is provided with an electronic control unit (ECU) 90 as a control device for controlling the vehicle 1. The ECU 90 is provided with a memory such as a read only memory (ROM) and random access memory (RAM), a central processing unit (CPU), an input port, an output port, a communication module, etc. In the present embodiment, a single ECU 90 is provided, but a plurality of ECUs may be provided for the different functions.

The outputs of various sensors provided at the vehicle 1 are input to the ECU 90. In the present embodiment, the outputs of an air flow meter 81, differential pressure sensor 82, voltage sensor 83, position sensor 84, and crank angle sensor 85 are input to the ECU 90.

As shown in FIG. 2, the air flow meter 81 is arranged at the upstream side of the throttle valve 58 in the intake pipe 55. The air flow meter 81 detects the intake air amount. The air flow meter 81 is electrically connected to the ECU 90. The output of the air flow meter 81 is sent to the ECU 90.

The differential pressure sensor 82 is provided at the exhaust passage and detects the difference between the pressure at the upstream side of the filter 61 inside the exhaust pipe 60 and the pressure at the downstream side of the filter 61 in the exhaust pipe 60, that is, the pressure difference before and after the filter 61. The differential pressure sensor 82 is electrically connected to the ECU 90. The output of the differential pressure sensor 82 is sent to the ECU 90.

The voltage sensor 83 is provided at the battery 20 and detects the voltage across the electrodes of the battery 20. The voltage sensor 83 is electrically connected to the ECU 90. The output of the voltage sensor 83 is sent to the ECU 90. The ECU 90 calculates the charged rate (SOC: state of charge) of the battery 20 based on the output of the voltage sensor 83 etc. The higher the SOC of the battery 20, the smaller the amount of power which can be charged to the battery 20.

The position sensor 84 detects the amount of depression of an accelerator pedal provided at the vehicle 1. The position sensor 84 is electrically connected to the ECU 90. The output of the position sensor 84 is sent to the ECU 90. The ECU 90 calculates the driver demanded output based on the output of the position sensor 84.

The crank angle sensor 85 generates an output pulse every time a crankshaft rotates by a predetermined angle (for example 15°). The crank angle sensor 85 is electrically connected to the ECU 90. The output of the crank angle sensor 85 is sent to the ECU 90. The ECU 90 calculates the engine speed based on the output of the crank angle sensor 85.

In the present embodiment, the ECU 90 runs programs etc., stored in the memory to function as a trapped amount calculating part 91, a state-of-charge estimating part 92, an engine load setting part 93, and an internal combustion engine control part 94. The trapped amount calculating part 91 calculates the amount of PM trapped at the filter 61 (below, referred to as the "amount of trapped PM"). For example, the trapped amount calculating part 91 calculates the amount of trapped PM based on the output of the differential pressure sensor 82. The greater the amount of trapped PM, the more the filter 61 is clogged and the greater the pressure difference before and after the filter 61. For this reason, the greater the output of the differential pressure sensor 82, the greater the amount of trapped PM is made.

Note that, the trapped amount calculating part 91 may calculate the amount of PM supplied to the filter 61 based on the operating state of the internal combustion engine 10 (fuel injection amount, intake air amount, engine speed, etc.) and cumulatively add the amount of PM calculated to calculate the amount of trapped PM. In this case, the trapped amount calculating part 91 causes the amount of trapped PM to decrease when a condition for PM to be removed from the filter 61 is satisfied. The condition for PM to be removed from the filter 61 is satisfied when the temperature of the exhaust gas flowing into the filter 61 is equal to or more than a predetermined temperature (for example 600 to 650° C.). The temperature of the exhaust gas flowing into the filter 61 is detected by a temperature sensor or is calculated based on the operating state of the internal combustion engine 10.

Further, in the internal combustion engine 10, fuel cut control where the supply of fuel to the combustion chambers 45 is stopped is performed when a predetermined execution condition is satisfied. If fuel cut control is performed, a large amount of oxygen is supplied to the filter 61, so burning of the PM is promoted. For this reason, when the temperature of the exhaust gas flowing into the filter 61 is equal to or more than a predetermined temperature and fuel cut control is being performed, the amount of reduction of the amount of trapped PM may be made greater.

The state-of-charge estimating part 92 estimates the state of charge of the battery 20. For example, the state-of-charge estimating part 92 estimates the state of charge of the battery 20 based on the SOC of the battery 20. Specifically, the state-of-charge estimating part 92 estimates that the battery 20 can be charged when the SOC of the battery 20 is less than a predetermined value and estimates that the battery 20 cannot be charged when the SOC is equal to or more than the predetermined value.

Note that, the state-of-charge estimating part 92 may estimate the state of charge of the battery 20 based on the allowable charging power Win. In this case, the state-of-charge estimating part 92 estimates that the battery 20 can be charged when the allowable charging power Win is equal to or more than a predetermined value, and estimates that the battery 20 cannot be charged when the allowable charging power Win is less than the predetermined value. The allowable charging power Win is calculated based on the SOC of the battery 20, the temperature of the battery 20, etc. The temperature of the battery 20 is, for example, detected by a temperature sensor.

The engine load setting part 93 sets the engine load. The internal combustion engine control part 94 controls the internal combustion engine 10 based on the engine load set by the engine load setting part 93. The internal combustion engine control part 94 makes the intake air amount and fuel injection amount increase when the engine load increases and makes the intake air amount and fuel injection amount decrease when the engine load decreases. Therefore if the engine load increases, the output of the internal combustion engine 10 becomes higher, while if the engine load decreases, the output of the internal combustion engine 10 becomes lower.

In this regard, if the amount of trapped PM becomes greater, the filter 61 will become clogged. As a result, the back pressure will rise and the fuel efficiency will deteriorate. For this reason, before the filter 61 becomes clogged, the PM is preferably burned off to regenerate the filter 61. When the temperature of the exhaust gas flowing into the filter 61 is equal to or more than a predetermined temperature (for example 600 to 650° C.), the speed of burning the PM becomes faster and the regeneration of the filter 61 is promoted. To make the temperature of the exhaust gas rise, it is necessary to make the engine load increase.

However, if making the engine load increase when the driver demanded output is low, the output of the internal combustion engine 10 will become higher than the driver demanded output. For this reason, to freely change the engine load, it is necessary to distribute the output of the internal combustion engine 10 to elsewhere besides the wheel shaft 34. In the present embodiment, when the battery 20 can be charged, the power generated using the output of the internal combustion engine 10 can be supplied to the battery 20.

For this reason, in the present embodiment, when it is estimated by the state-of-charge estimating part 92 that the battery 20 can be charged, the engine load setting part 93 makes the engine load increase in the case where the amount of trapped PM is relatively large compared to in the case where the amount of trapped PM is relatively small. By doing this, it is possible to remove the PM trapped at the filter 61 at a suitable timing regardless of the driver demanded output. Therefore, it is possible to effectively remove the PM trapped at the filter 61.

As explained above, by making the engine load increase, it is possible to make the temperature of the exhaust gas rise and to promote regeneration of the filter 61. However, making the engine load increase regardless of the driver demanded output is liable to cause deterioration of the fuel efficiency of the internal combustion engine 10. Further, even if the temperature of the exhaust gas flowing into the filter 61 is less than a predetermined value, an amount of PM corresponding to that temperature will burn. For this reason, when the amount of trapped PM is small, the engine load does not necessarily have to be increased so that the temperature of the exhaust gas becomes equal to or more than a predetermined value (for example 600 to 650° C.).

For this reason, when making the engine load increase, the engine load setting part 93 changes the amount of increase of the engine load in accordance with the amount of trapped PM. By doing this, it is possible to suppress deterioration of the fuel efficiency of the internal combustion engine 10 while effectively removing the PM trapped by the filter 61.

<Processing for Setting Engine Load>

Figure 4:
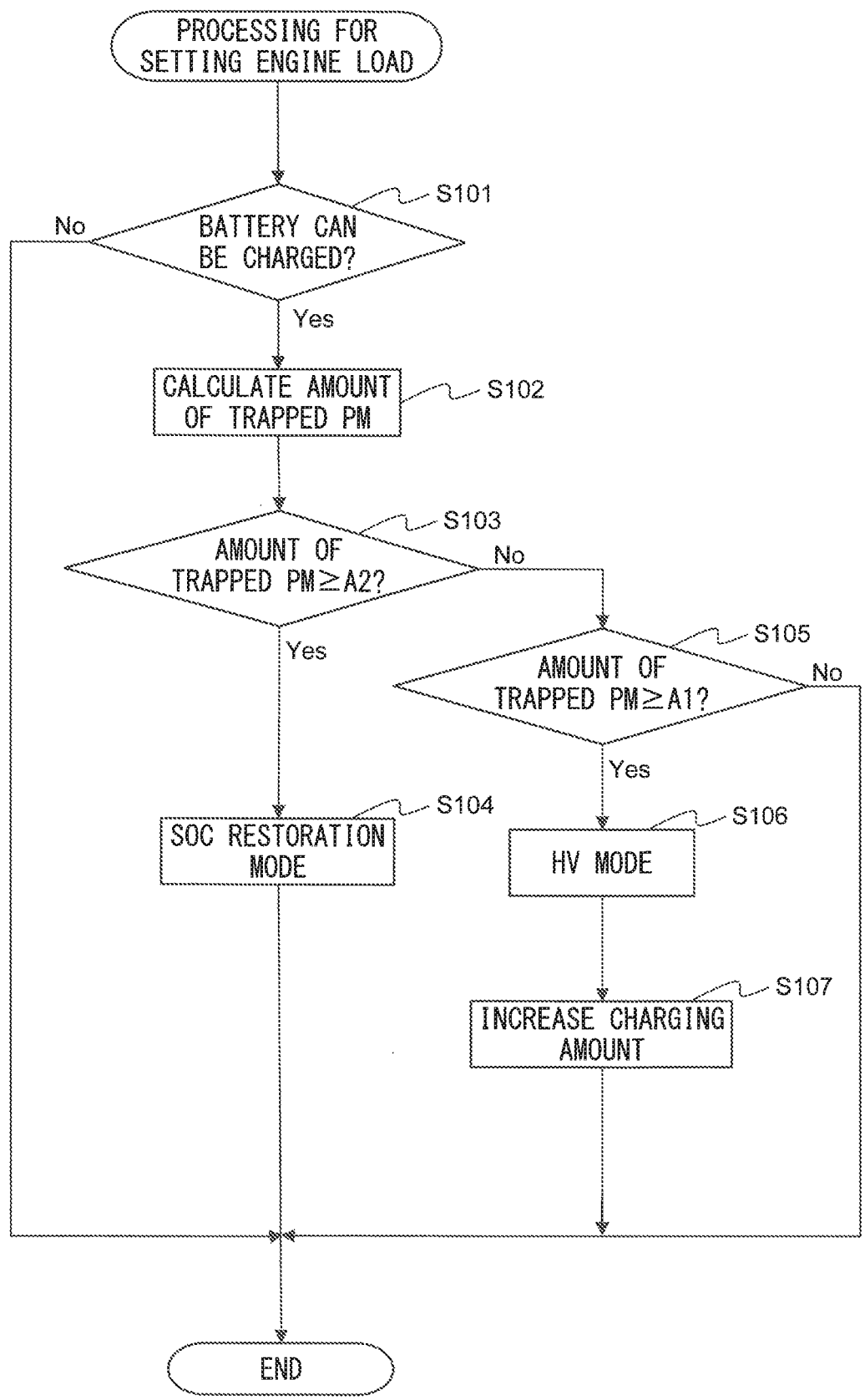
FIG. 4 is a flow chart showing a control routine of processing for setting the engine load in the first embodiment of the present invention.

Below, referring to the flow chart of FIG. 4, the control for setting the engine load will be explained in detail. FIG. 4 is a flow chart showing the control routine of the processing for setting the engine load in the first embodiment of the present invention. The control routine is repeatedly performed by the ECU 90 at predetermined time intervals.

First, at step S101, the state-of-charge estimating part 92 judges whether the battery 20 can be charged. If it is judged that the battery 20 cannot be charged, the control routine ends. In this case, the engine load setting part 93 sets the engine load based on the driver demanded output and the battery 20 is not charged.

On the other hand, if at step S101 it is judged that the battery 20 can be charged, the control routine proceeds to step S102. At step S102, the trapped amount calculating part 91 calculates the amount of trapped PM. Next, at step S103, the engine load setting part 93 judges whether the amount of trapped PM is equal to or more than a second reference amount A2. The second reference amount A2 is predetermined and is set to a value smaller than the amount of PM when the filter 61 is completely clogged.

If at step S103 it is judged that the amount of trapped PM is equal to or more than the second reference amount A2, the control routine proceeds to step S104. At step S104, the engine load setting part 93 sets the operating mode of the vehicle 1 to the SOC restoration mode. In the SOC restoration mode, the engine load is made to increase so that the SOC of the battery 20 becomes higher, and the power generated using the output of the internal combustion engine 10 is supplied to the battery 20. As a result, the filter 61 is forcibly regenerated. Note that, the engine load (mean value) at the SOC restoration mode becomes the highest among all operating modes. After step S104, the control routine ends.

On the other hand, if at step S103 it is judged that the amount of trapped PM is less than the second reference amount A2, the control routine proceeds to step S105. At step S105, the engine load setting part 93 judges whether the amount of trapped PM is equal to or more than a first reference amount A1. The first reference amount A1 is predetermined and is set to a value smaller than the second reference amount A2.

If at step S105 it is judged that the amount of trapped PM is less than the first reference amount A1, the control routine ends. In this case, the engine load setting part 93 sets the engine load based on the driver demanded output and the SOC of the battery 20.

On the other hand, if at step S105 it is judged that the amount of trapped PM is equal to or more than the first reference amount A1, the control routine proceeds to step S106. At step S106, the engine load setting part 93 sets the driving mode of the vehicle 1 to the HV mode. At the HV mode, as the power source for driving use, the internal combustion engine 10 and second motor generator 16 are jointly used. In the HV mode, the target outputs of the internal combustion engine 10 and second motor generator 16 are set based on the vehicle speed, SOC of the battery 20, driver demanded output, etc.

Next, at step S107, the engine load setting part 93 increases the charging amount of the battery 20 at the HV mode. For example, the engine load setting part 93 increases the charging amount of the battery 20 by raising the target value of the SOC of the battery 20. By doing this, the opportunities for charging the battery 20 by the output of the internal combustion engine 10 increase. Compared with the usual HV mode, the engine load (mean value) becomes higher. Note that, the engine load (mean value) at this time is lower than the engine load (mean value) at the SOC restoration mode. After step S107, the control routine ends.

Second Embodiment

The vehicle according to the second embodiment is basically similar in configuration and control to those according to the first embodiment except for the points explained below. For this reason, below, the second embodiment of the present invention will be explained focusing on the parts different from the first embodiment.

If the filter 61 is regenerated when the amount of trapped PM is extremely large, the amount of heat generated by burning the PM will become greater and the filter 61 is liable to be degraded. Further, if the amount of trapped PM further increases when the amount of trapped PM is extremely great, this will have an effect on the operation of the internal combustion engine 10. For this reason, when the amount of trapped PM is extremely large, it is preferable to reduce the amount of generation of PM rather than remove the PM. Further, if the battery 20 can be discharged, it is possible to operate the vehicle 1 using mainly the output of the second motor generator 16.

For this reason, in the second embodiment, the engine load setting part 93 sets the engine load to a predetermined value or less when it is estimated by the state-of-charge estimating part 92 that the battery 20 can be discharged and the amount of trapped PM is equal to or more than a reference value. By doing this, even if the amount of trapped PM is extremely great, it is possible to keep the vehicle 1 running by reducing the amount of PM generated.

<Processing for Setting Engine Load>

Figure 5:
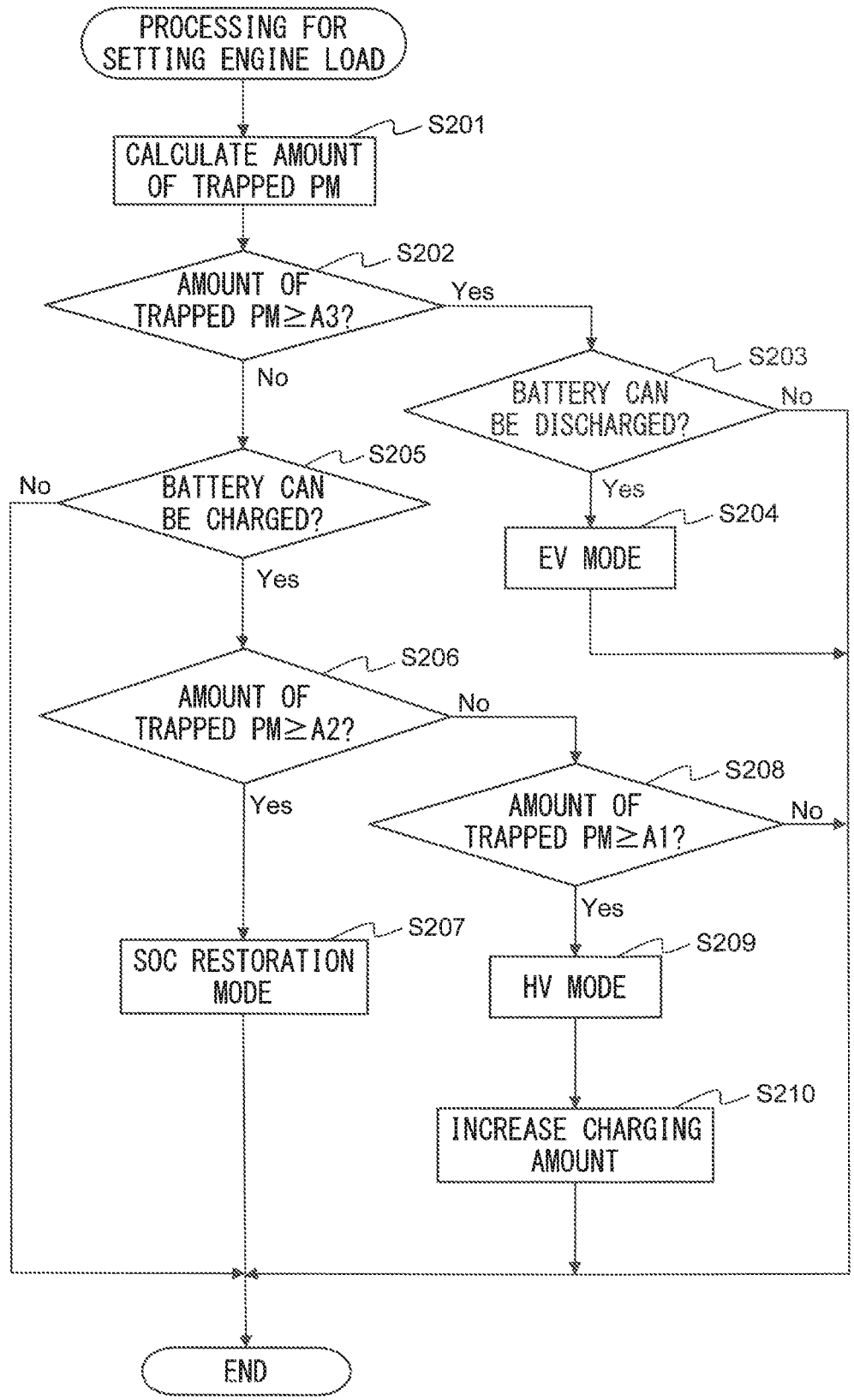
FIG. 5 is a flow chart showing a control routine of processing for setting the engine load in a second embodiment of the present invention.

FIG. 5 is a flow chart showing the control routine of the processing for setting the engine load in the second embodiment of the present invention. The control routine is repeatedly performed by the ECU 90 at predetermined time intervals.

First, at step S201, the trapped amount calculating part 91 calculates the amount of trapped PM. Next, at step S202, the engine load setting part 93 judges whether the amount of trapped PM is equal to or more than a third reference value A3. The third reference value A3 is predetermined and is set to a value larger than the first reference amount A1 and second reference amount A2. For example, the third reference value A3 is the amount of trapped PM when the filter 61 is completely clogged.

If at step S202 it is judged that the amount of trapped PM is equal to or more than the third reference value A3, the control routine proceeds to step S203. At step S203, the state-of-charge estimating part 92 judges whether the battery 20 can be discharged. For example, the state-of-charge estimating part 92 estimates that the battery 20 cannot be discharged when the SOC of the battery 20 is less than a predetermined value and estimates the battery 20 can be discharged when the SOC of the battery 20 is equal to or more than the predetermined value.

Note that, the state-of-charge estimating part 92 may estimate that the battery 20 can be discharged when the allowable discharge power Wout is equal to or more than a predetermined value and estimate that the battery 20 cannot be discharged when the allowable discharging power Wout is less than the predetermined value. The allowable discharging power Wout is calculated based on the SOC of the battery 20, the temperature of the battery 20, etc. The temperature of the battery 20 is for example detected by a temperature sensor.

If at step S203 it is judged that the battery 20 cannot be discharged, the control routine ends. On the other hand, if at step S203 it is judged that battery 20 can be discharged, the control routine proceeds to step S204. At step S204, the engine load setting part 93 sets the operating mode of the vehicle 1 to the EV mode. In the EV mode, the internal combustion engine 10 is stopped and only the second motor generator 16 is used as the source of power for driving. Therefore, the engine load setting part 93 sets the engine load to zero. By doing this, the amount of PM generated can be reduced to zero. After step S204, the control routine ends.

Further, if at step S202 it is judged that the amount of trapped PM is less than the third reference value A3, the control routine proceeds to step S205, Step S205 to step S210 are similar to step S101 and step S103 to step S107 at FIG. 4, so explanations will be omitted.

Note that, at step S204, the engine load setting part 93 may set the driving mode of the vehicle 1 to the HV mode and set the engine load to a predetermined value or less. Further, if at step S202 it is judged that amount of trapped PM is equal to or more than the third reference value A3, a warning light provided at the vehicle 1 may be turned on to notify the driver of the abnormality of the filter 61.

Third Embodiment

The vehicle according to the third embodiment is basically similar in configuration and control to those according to the first embodiment except for the points explained below. For this reason, below, the third embodiment of the present invention will be explained focusing on the parts different from the first embodiment.

<Processing for Setting Engine Load>

Figure 6:
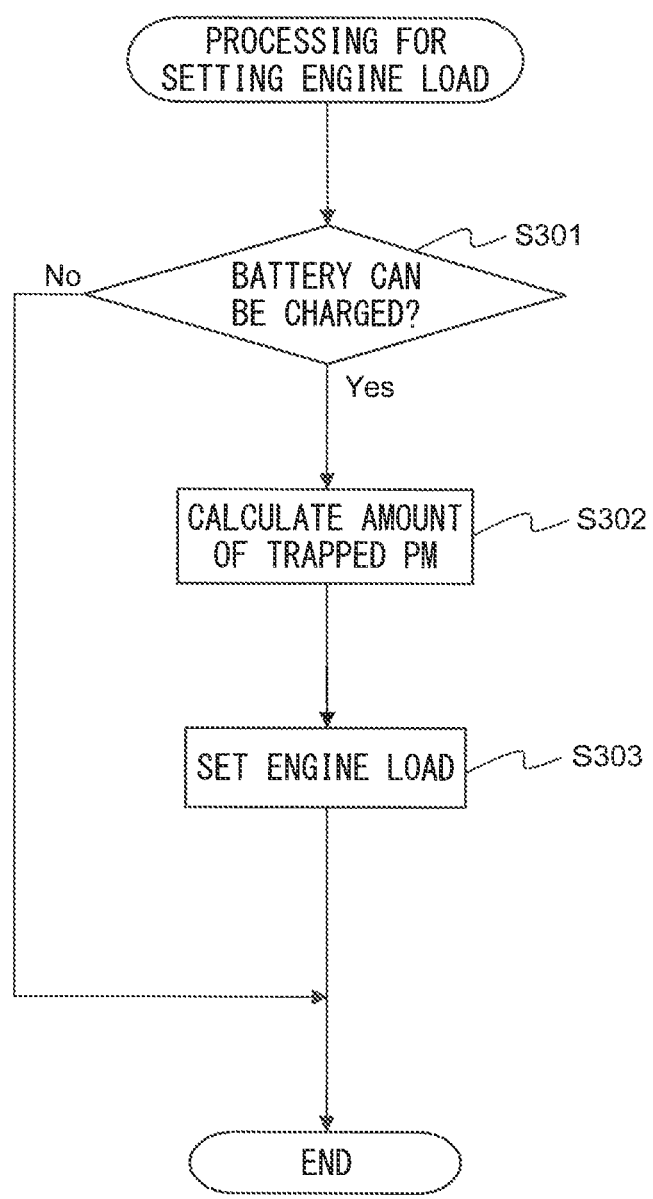
FIG. 6 is a flow chart showing a control routine of processing for setting the engine load in a third embodiment of the present invention.

FIG. 6 is a flow chart showing the control routine of the processing for setting the engine load in the third embodiment of the present invention. The control routine is repeatedly performed by the ECU 90 at predetermined time intervals.

First, at step S301, the state-of-charge estimating part 92 judges whether the battery 20 can be charged. If it is judged that the battery 20 cannot be charged, the control routine ends. In this case, the engine load setting part 93 sets the engine load based on the driver demanded output and the battery 20 is not charged.

On the other hand, if at step S301 it is judged that the battery 20 can be charged, the control routine proceeds to step S302. At step S302, the trapped amount calculating part 91 calculates the amount of trapped PM.

Figure 7:
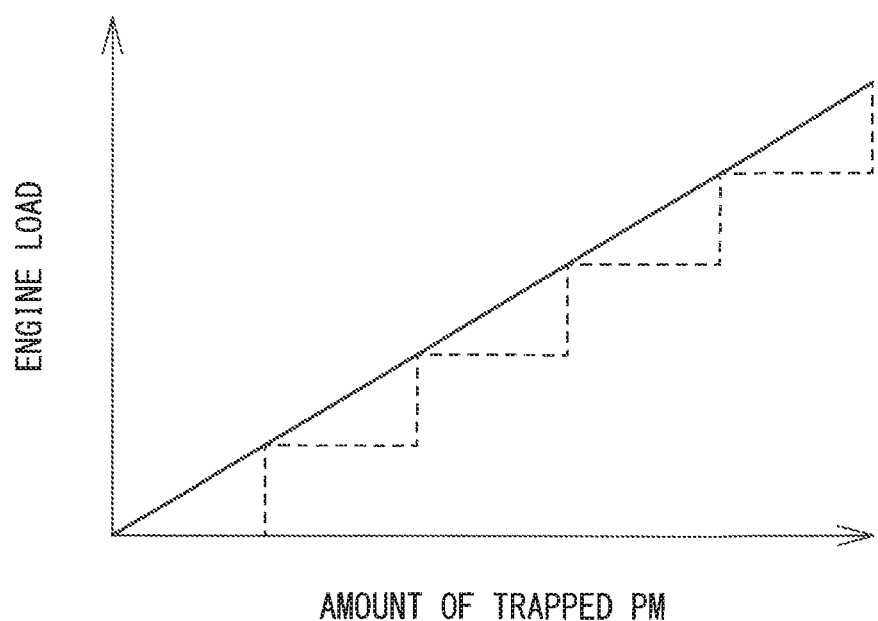
FIG. 7 is a view showing a relationship of an amount of trapped PM and an engine load.

Next, at step S303, the engine load setting part 93 sets the engine load based on the amount of trapped PM. For example, as shown in. FIG. 7 by the solid line, the engine load setting part 93 makes the engine load continuously increase as the amount of trapped PM becomes greater. By doing this, the engine load is set to a suitable value corresponding to the amount of trapped PM, so the PM trapped at the filter 61 can be removed more effectively. At the solid line of FIG. 7, the engine load is made to increase linearly as the amount of trapped PM becomes greater. Note that, as shown in FIG. 7 by the broken line, the engine load setting part 93 may make the engine load increase in stages (stepwise) as the amount of trapped PM becomes larger.

Further, until the temperature of the exhaust gas flowing into the filter 61 reaches a predetermined temperature (for example 600 to 650° C.), the speed of burning of the PM increases proportionally to the engine load and the amount of PM removed also increases proportionally to the engine load. On the other hand, after the temperature of the exhaust gas flowing into the filter 61 reaches a predetermined temperature (for example 600 to 650° C.), burning of the PM is promoted by the increase of the amount of oxygen in the exhaust gas. However, even if making the engine load increase, the amount of PM removed will not become much greater.

Figure 8:
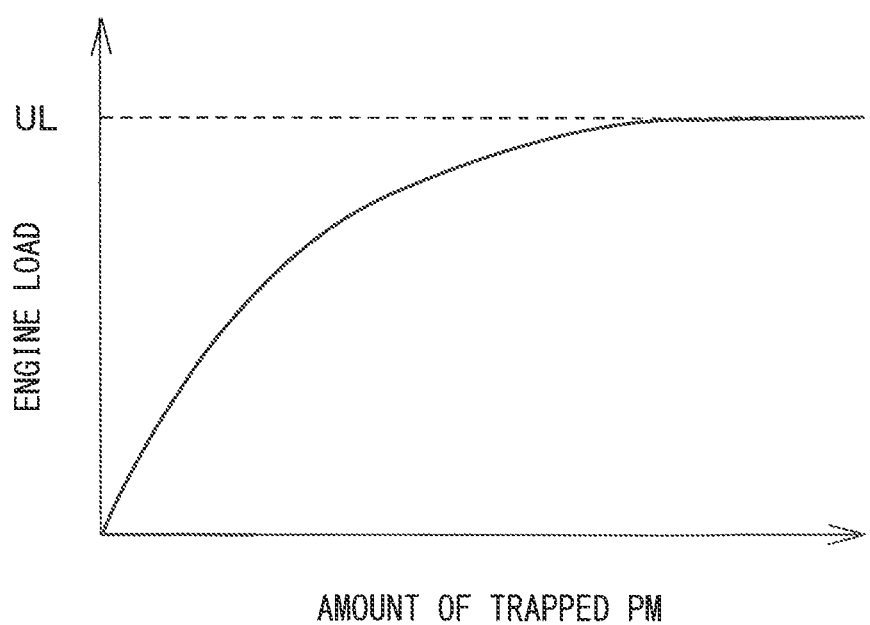
FIG. 8 is a view showing a relationship of an amount of trapped PM and an engine load.

For this reason, as shown in FIG. 8, the engine load setting part 93 may continuously make the engine load increase as the amount of trapped PM becomes larger and make the rate of increase of the engine load with respect to the amount of trapped PM (slant of graph of FIG. 8) lower. By doing this, it is possible to set the engine load to a more suitable value corresponding to the amount of trapped PM.

Further, if excessively making the engine load increase, the amount of heat generated by burning of the PM becomes greater and the filter 61 is liable to be degraded. For this reason, as shown in FIG. 8, when making the engine load increase, the engine load setting part 93 may set the engine load to the upper limit value UL or less. By doing this, it is possible to suppress degradation of the filter 61 while effectively removing PM trapped at the filter 61. The upper limit value UL is predetermined and is set to a value smaller than the maximum engine load. Note that, at step S303, the engine load is set as a mean value or upper limit value. After step S303, the control routine ends.

Fourth Embodiment

The vehicle according to the fourth embodiment is basically similar in configuration and control to those according to the first embodiment except for the points explained below. For this reason, below, the fourth embodiment of the present invention will be explained focusing on the parts different from the first embodiment.

In the fourth embodiment, to suppress deterioration of the filter 61, when making the engine load increase, the engine load setting part 93 sets the engine load to an upper limit value or less. However, even if making the engine load increase, the amount of power supplied to the battery 20 cannot be made greater than the amount of power which can be charged to the battery 20. Therefore, in, the fourth embodiment, the engine load setting part 93 raises the upper limit value the larger the amount of power which can be charged to the battery 20. By doing this, it is possible to set the engine load to a suitable value corresponding to not only the amount of trapped PM but also the amount of power which can be charged to the battery 20.

<Processing for Setting Engine Load>

Figure 9:
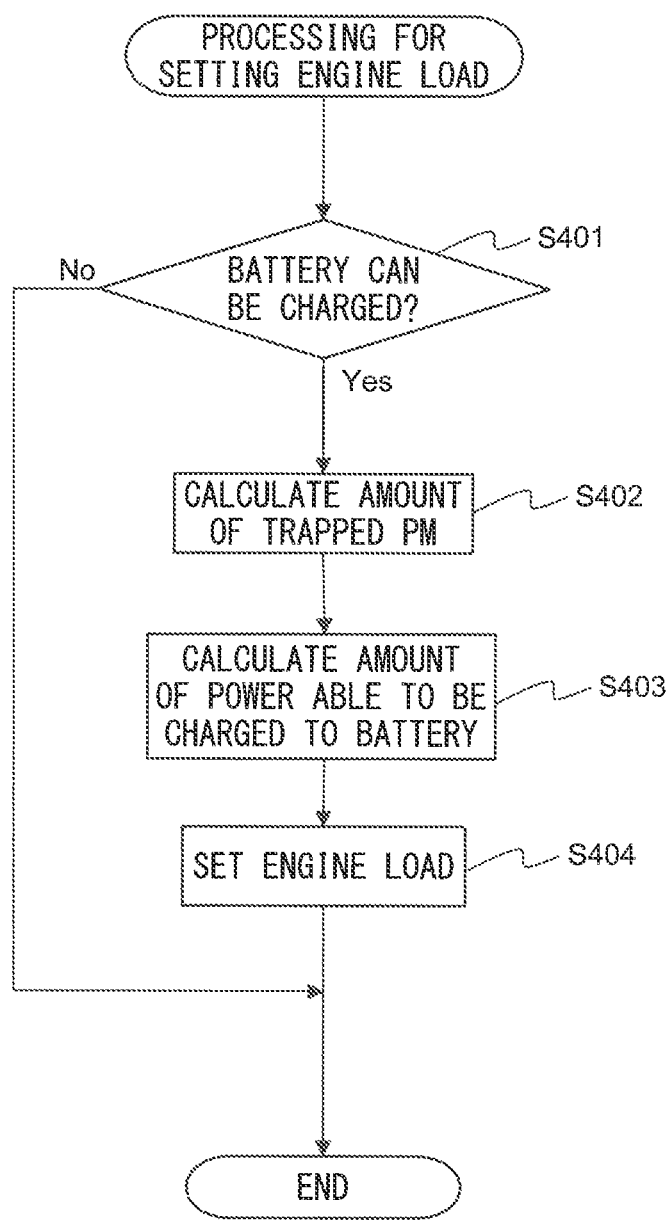
FIG. 9 is a flow chart showing a control routine of processing for setting the engine load in a fourth embodiment of the present invention.

FIG. 9 is a flow chart showing the control routine of the processing for setting the engine load in the fourth embodiment of the present invention. The control routine is repeatedly performed by the ECU 90 at predetermined time intervals.

First, at step S401, the state-of-charge estimating part 92 judges whether the battery 20 can be charged. If it is judged that the battery 20 cannot be charged, the control routine ends. On the other hand, if it is judged that the battery 20 can be charged, the control routine proceeds to step S402. At step S402, the trapped amount calculating part 91 calculates the amount of trapped PM.

Next, at step S403, the state-of-charge estimating part 92 calculates the amount of power which can be charged to the battery 20 based on the SOC of the battery 20. The lower the SOC of the battery 20, the greater the amount of power which can be charged to the battery 20. Note that, the state-of-charge estimating part 92 may calculate the amount of power which can be charged to the battery 20 based on the allowable charging power Win. The larger the allowable charging power Win, the greater the amount of power which can be charged to the battery 20.

Figure 10:
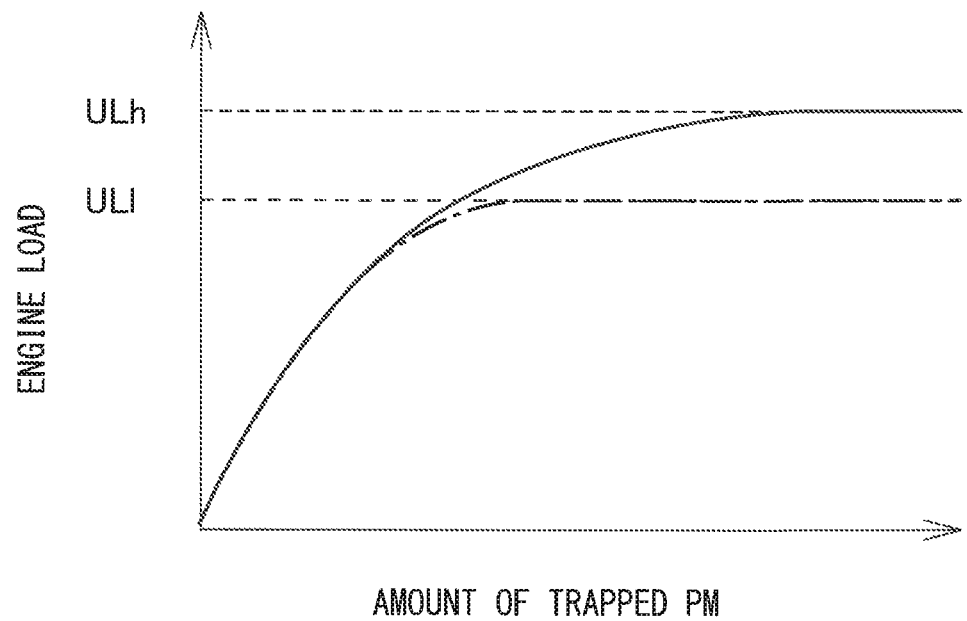
FIG. 10 is a view showing a relationship of an amount of trapped PM and an engine load.

Next, at step S404, the engine load setting part 93 sets the engine load based on the amount of trapped PM and the amount of power which can be charged to the battery 20. FIG. 10 is a view showing the relationship between the amount of trapped PM and the engine load. In FIG. 10, the graph when the amount of power which can be charged to the battery 20 is relatively large is shown by the solid line, while the graph when the amount of power which can be charged to the battery 20 is relatively small is shown by the broken line. The upper limit value ULh of the engine load when the amount of power which can be charged to the battery 20 is relatively large is made higher than the upper limit value UL1 of the engine load when the amount of power which can be charged to the battery 20 is relatively small.

Figure 11:
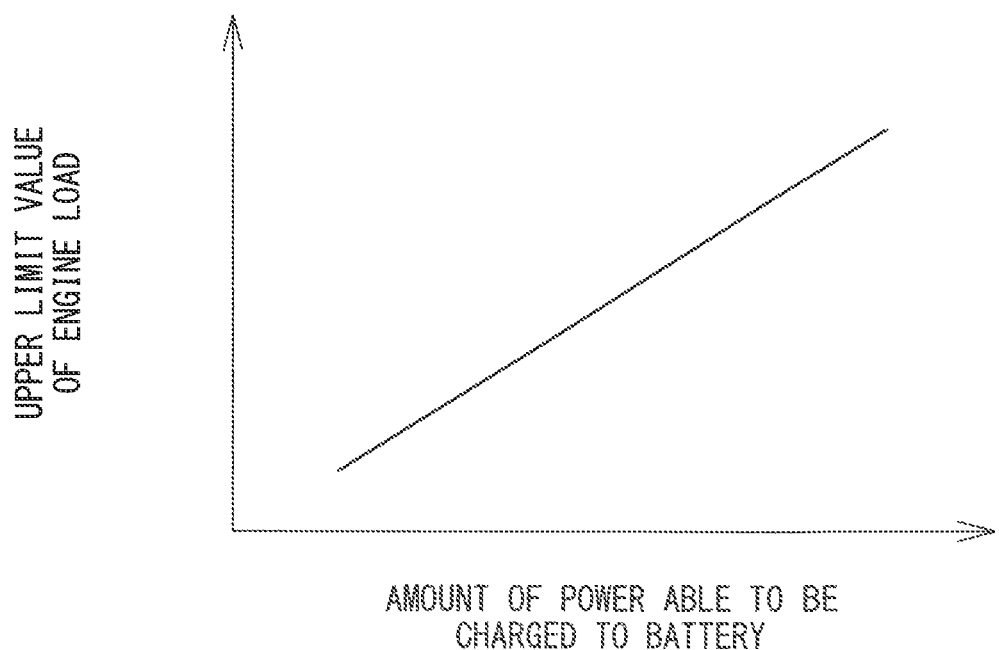
FIG. 11 is a view showing a relationship of an amount of electric power able to be charged to a battery and an upper limit value of an engine load.

FIG. 11 is a view showing the relationship between an amount of power able to be charged into the battery 20 and the upper limit value of the engine load. As shown in FIG. 11, the engine load setting part 93 raises the upper limit value of the engine load the greater the amount of power which can be charged to the battery 20. After step S404, the control routine ends.

OTHER EMBODIMENTS

Above, preferred embodiments of the present invention were explained, but the present invention is not limited to these embodiments and can be corrected and changed in various ways within the language of the claims.

For example, the first motor generator 12 may be a generator not functioning as a motor. Further, the second motor generator 16 may be a motor not functioning as a generator. Further, a one-way clutch transmitting rotational force only in one direction may be provided at the power distribution mechanism 14, and the first motor generator 12 may also output power for driving use.

Further, the vehicle 1 is a so-called series-parallel type hybrid vehicle. However, the vehicle 1 may be a so-called series type, parallel type, or various other types of hybrid vehicles. Further, the vehicle 1 need not be a plug-in hybrid vehicle. That is, the battery 20 need not be charged by an outside power source 70.

Further, the above embodiments can be freely combined and worked. For example, the second embodiment can be combined with the third embodiment or the fourth embodiment. If the second embodiment is combined with the third embodiment, step S201 to step S204 of FIG. 5 are added before step S301 of FIG. 6 while step S302 of FIG. 6 is deleted. Further, if the second embodiment is combined with the fourth embodiment, step S201 to step S204 of FIG. 5 are added before step S401 of FIG. 9 while Step S402 of FIG. 9 is deleted.

Further, in the first embodiment, an upper limit value of the engine load may be determined and the engine load may be set to the upper limit value or less. Further, as shown in FIG. 7, even when making the engine load change linearly or step-wise, an upper limit value of the engine load may be determined and the engine load may be set to the upper limit value or less.

REFERENCE SIGNS LIST

1 vehicle
10 internal combustion engine
16 second motor generator
20 battery
60 exhaust pipe
61 filter
90 electronic control unit (ECU)
91 trapped amount calculating part
92 state-of-charge estimating part
93 engine load setting part
94 internal combustion engine control part

The invention claimed is:

1. A vehicle comprising:
   an internal combustion engine able to output power for driving use;
   a filter disposed in an exhaust passage of the internal combustion engine and configured to trap particulate matter contained in exhaust gas;
   a motor able to output power for driving use;
   a battery configured to store power generated using the output of the internal combustion engine and supply power to the motor; and
   a processor programmed to:
      calculate an amount of particulate matter trapped by the filter;
      estimate a state of charge of the battery;
      set an engine load by:
         making the engine load increase in a case where the amount of the particulate matter is relatively large compared to a case where the amount of the particulate matter is relatively small when it is estimated that the battery can be charged; and
         changing an amount of increase of the engine load in accordance with the amount of the particulate matter when making the engine load increase; and
      control the internal combustion engine based on the set engine load.

2. The vehicle according to claim 1, wherein the processor is programmed to set the engine load by making the engine load increase in stages as the amount of the particulate matter becomes greater.

3. The vehicle according to claim 1, wherein the processor is programmed to set the engine load by making the engine load increase continuously as the amount of the particulate matter becomes greater.

4. The vehicle according to claim 3, wherein the processor is programmed to set the engine load by lowering a rate of increase of the engine load with respect to the amount of the particulate matter as the amount of the particulate matter becomes greater.

5. The vehicle according to claim 1, wherein the processor is programmed to set the engine load to a predetermined value or less when it is estimated that the battery can be discharged and the amount of the particulate matter is equal to or more than a reference value.

6. The vehicle according to claim 2, wherein the processor is programmed to set the engine load to a predetermined value or less when it is estimated that the battery can be discharged and the amount of the particulate matter is equal to or more than a reference value.

7. The vehicle according to claim 3, wherein the processor is programmed to set the engine load to a predetermined value or less when it is estimated that the battery can be discharged and the amount of the particulate matter is equal to or more than a reference value.

8. The vehicle according to claim 4, wherein the processor is programmed set the engine load to a predetermined value or less when it is estimated that the battery can be discharged and the amount of the particulate matter is equal to or more than a reference value.

9. The vehicle according to claim 5, wherein the reference value is an amount of the particulate matter when the filter is completely clogged.

10. The vehicle according to claim 6, wherein the reference value is an amount of the particulate matter when the filter is completely clogged.

11. The vehicle according to claim 7, wherein the reference value is an amount of the particulate matter when the filter is completely clogged.

12. The vehicle according to claim 8, wherein the reference value is an amount of the particulate matter when the filter is completely clogged.

13. The vehicle according to claim 5, wherein the processor is programmed to set the engine load to zero when it is estimated that the battery can be discharged and the amount of the particulate matter is equal to or more than the reference value.

14. The vehicle according to claim 9, wherein the processor is programmed to set the engine load to zero when it is estimated that the battery can be discharged and the amount of the particulate matter is equal to or more than the reference value.

15. The vehicle according to claim 1, wherein the processor is programmed to set the engine load to an upper limit value or less when making the engine load increase, the upper limit value being smaller than a maximum engine load.

16. The vehicle according to claim 15, wherein the processor is programmed to raise the upper limit value the greater an amount of power which can be charged to the battery.

17. A vehicle comprising:
    an internal combustion engine able to output power for driving use;
    a filter disposed in an exhaust passage of the internal combustion engine and configured to trap particulate matter contained in exhaust gas;
    a motor able to output power for driving use;
    a battery configured to store power generated using the output of the internal combustion engine and supply power to the motor; and
    a control device configured to:
        calculate an amount of particulate matter trapped by the filter;
        estimate a state of charge of the battery;
        set an engine load by:
            making the engine load increase in a case where the amount of the particulate matter is relatively large compared to a case where the amount of the particulate matter is relatively small when it is estimated that the battery can be charged; and
            changing an amount of increase of the engine load in accordance with the amount of the particulate matter when making the engine load increase; and
        control the internal combustion engine based on the set engine load.

* * * * *